3,342,910
PROCESS FOR PREPARING NUCLEAR FUEL ELEMENTS OF DISPERSED-IN-GRAPHITE TYPE
Takehiko Ishihara, Mito-shi, Toshio Honda, Naka-gun, Ibaraki-ken, and Ken Ohwada, Naka-machi, Japan, assignors to Japan Atomic Energy Research Institute, Tokyo, Japan
Filed Nov. 2, 1964, Ser. No. 408,412
Claims priority, application Japan, Nov. 5, 1963, 38/59,223
5 Claims. (Cl. 264—.5)

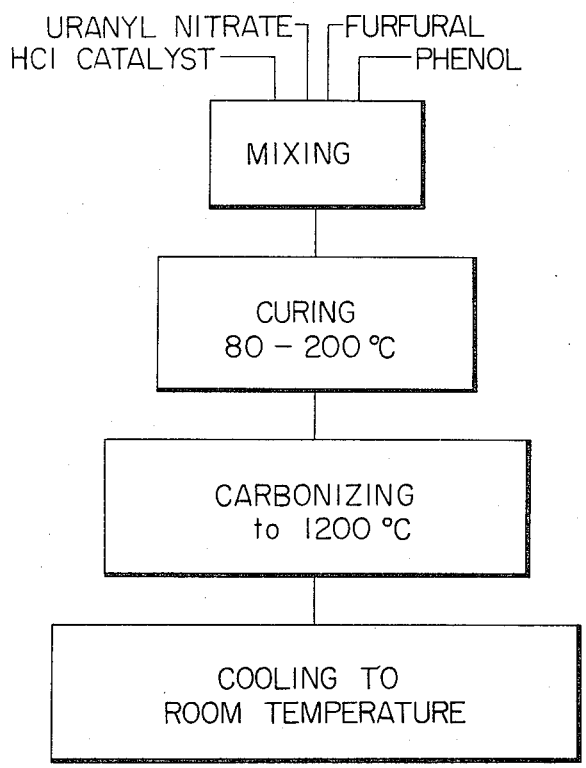

This invention relates to a process of preparing nuclear fuel elements in which uranium is dispersed in a graphite matrix, and particularly to the preparation of fuel elements whose graphite matrix is impermeable to volatile fission products.

Known methods for preparing such fuel elements rely on the compacting of powders, on impregnation of a graphite element with uranium, and on decomposition of uranium salts. They do not result in the desired homogeneous distribution of the uranium in the graphite matrix and require secondary treatments for making the element impermeable to volatile fission products.

It has now been found that uranium is present in certain polymers of high molecular weight as a uniformly distributed chelate, and that a uranium bearing resin prepared by the condensation of furfural with phenol in the presence of uranium salts can be converted by heat into a practically impermeable carbon body in which uranium is dispersed in minute particles of a magnitude of the order of a micron which are stable and do not tend to coagulate.

It is established that the mean recoil path of fission fragments in uranium oxide is less than 5 microns. It is therefore important for effective utilization of the thermal energy of the fission products that the size of the uranium oxide particles in a fuel element be less than five microns.

The process of the invention consists of the following steps illustrated in the flow diagram of the accompanying drawing:

(1) Furfural, phenol, the desired amount of uranyl nitrate, and a small amount of hydrochloric acid are mixed.

(2) The mixture is polymerized at elevated temperature (80° C.–200° C.) to form a solid resin body.

(3) The resin body is carbonized in a protective atmosphere by gradual heating to 1200° C., whereby the carbon is only partly converted to graphite, and slow cooling to room temperature.

The following example further illustrates this invention.

*Example*

20 grams of uranyl nitrate hexahydrate were dissolved in 200 ml. of furfural. An amount of the solution corresponding to two mols of furfural and 1 mol of phenol were mixed and a small amount of concentrated HCl was added as a catalyst. The mixture was poured into a smooth-surfaced mould of 10 mm. $\phi$ x 100 mm., and was exposed to the air at 80° C. for about 36 hours during which condensation polymerization proceeded. After the mixture solidified and hardened, the formed resin lump was removed from the mould and kept in air at 190° C. for about 1 week whereby a black resin lump in which the uranyl radical was evenly distributed was obtained. The uranium content desired in the final product determines the amount of uranyl nitrate to be added to the resin-forming material. Uranyl nitrate does not cause cracking or spalling of the resin lump if its content is not more than 20% by weight. The linear shrinkage of the resin lump through polymerization is 8–12%. The result of infrared spectroscopic analysis showed that the uranyl radical was present in a chelated state, and the X-ray analysis of surfaces of the lump produced by slicing the same into sections showed no substantial difference from section to section.

The uranyl-containing resin was heated in an argon atmosphere in a resistance furnace. The furnace temperature was raised by 100° C./hr. up to 500° C., then by 200° C./hr. to 1200° C. and was kept at 1100° C. for ca. 1 hour, whereupon the furnace was cooled slowly to room temperature. By this treatment the resin was carbonized. Microscopic examination did not reveal cracks in the surface of the carbonized lump. Linear shrinkage through this treatment was 10–30%. X-ray diffraction analysis showed broad peaks in the diffraction pattern at the positions corresponding to (002) and (004) of graphite, but ripples corresponding to uranium as $UO_2$, $U_3O_8$ or uranium carbides were not observed.

A sample of the carbonized resin was heated in a hydrogen atmosphere at 2550° C. for ca. 1 hour and was slowly cooled to room temperature. The sample was tested by X-ray diffraction method which showed a graphitization degree of 12–16%, but peaks due to oxides of uranium were not observed. A radioautograph of the same sample indicated that the distribution of the uranium was almost even throughout the lump.

The sample was crushed into 200 mesh powder and soaked in hot concentrated nitric acid for 6 hours, whereupon uranium could not be detected in the nitric acid solution by colorimetric anaylsis (hydrogen peroxide method).

In this process, the role of hydrochloric acid as catalyst is extremely important, and the key to a good product lies in the control of temperature in the polymerization (curing) and baking stages. Hydrogen chloride seems to act as dehydrogenation catalyst in the baking stage and as dehydration catalyst in the condensation stage. Cracking or spalling during backing is though to be due to occluded moisture and hydrogen and other gases evolved by decomposition of organic polymer, and hydrogen chloride seems to be instrumental in removal of such gases within the lump, though the mechanism of gas removal is not yet fully understood.

We have also found that the optimum temperature and length of time required for curing and baking are closely related to the amount of hydrochloric acid used. Addition of a large amount of hydrochloric acid (10–20% by weight of the resin forming mixture) accelerates curing (less than 10 hours), but it leads to cracking in the baking stage, and therefore necessitates a very slow and very accurately regulated increase in the baking temperature in order to secure reproduceable results. On the other hand, the use of a rather small amount of hydrochloric acid (10–50 drops per 250 ml. of resin forming mixture) makes it possible to turn out uniform products with less stringent temperature control, though a long curing time is required.

Size of the final product depends on curing conditions. We prefer a two step curing cycle in which the material is first solidified in air at 50–80° C. for about 36 hours (80° C. is preferred), and then fully cured at 180–200° C. (190° C. is preferred) for about 1 week.

It is known that oxygen (or ozone) has some influence upon the curing of furfural-phenol resin. In the process of this invention, the resin lump is cured in the mould, and curing proceeds from the ends. Therefore, the longer the lump or stick, the longer the curing time. Incomplete curing causes cracking or spalling in the baking stage. Table 1 shows optimum curing conditions for 10 mm. $\phi$ sticks of various lengths:

TABLE 1

| Length (each 10 mm. $\phi$) | Curing condition |
|---|---|
| 100 mm | 1–2 weeks (at 80° C.) and 1–2 weeks (at 120° C.). |
| 200 mm | 3–4 weeks (at 80° C.) and 2 weeks (at 120° C.). |
| 300 mm | 3 months (at 80° C.) and 1 week (at 120° C.). |

The product has a metallic luster. The outside surface and a cross-sectional surface have a glass-like appearance and the latter has conchoidal structure. The lump is extremely impermeable. Examination with a microscope revealed no open pores, nor did a measurement of pore distribution by means of mercury intrusion porosimetry give any measurable results. Prior to this invention, carbon bodies of such high impermeability could not be prepared from polymerized resin.

X-ray powder diffractrometry gives no sign of existence or crystal growth of $UO_2$ or $U_3O_8$, and radioautography of the same sample indicated that uranium in minute particles is distributed homogeneously throughout the carbon matrix.

The carbon body of this invention has remarkable resistivity against oxidation and attack of strong chemical reagents. It is known that ordinary graphite articles, when soaked in an acid mixture, give off graphitic oxide, turning the liquid blue. A lump of artificial graphite soaked in a mixture of 69% (volume) concentrated $HNO_3$ and 31% (volume) concentrated $H_2SO_4$ at room temperature turned blue in several days, and X-ray diffraction showed the presence of graphitic oxide. The carbon body of this invention was soaked in the same acid mixture for one year under the same conditions, but discoloration was not noted, nor did X-ray diffraction examination indicate the formation of graphitic oxide.

The carbon body of this invention has far better oxidation resistance than ordinary graphite. The results of oxidation tests for some graphite products are shown in Table 2.

TABLE 2

| Type of Graphite | Reaction Time (weight loss) | | | |
|---|---|---|---|---|
| | 70% (min.) | 80% (min.) | 90% (min.) | 100% (min.) |
| Normal graphite | 68 | 95 | 110 | 140 |
| Pyrographite | 120 | 135 | 175 | 250 |
| High density graphite | 160 | 185 | 225 | 275 |
| The product of this invention* | 210 | 260 | 270 | 385 |

*Baked at 1,300° C.
6 mm. $\phi$ x 40 mm. test pieces are exposed to flow (space velocity 0.6) of oxygen-nitrogen mixture (25:75) at 800° C.±5° C.

What we claim is:
1. A process for preparing a nuclear fuel element impervious to the products of uranium fission which comprises:
   (a) pouring a liquid mixture of a uranium salt, furfural, and phenol into a mold, said uranium salt being dissolved in said furfural;
   (b) heating said mixture in said mold in the presence of a condensation catalyst to a temperature between about 50° C. to 200° C. until the mixture is solidified by reaction of said furfural with said phenol and forms a body of uranium bearing polymer resin;
   (c) heating said body in a protective atmosphere until said resin is substantially completely carbonized and not more than a minor portion of the carbon formed is converted to graphite; and
   (d) cooling the carbonized body to room temperature.
2. A process as set forth in claim 1, wherein said uranium salt is uranyl nitrate and said catalyst is hydrogen chloride.
3. A process as set forth in claim 2, wherein said resin body is heated to a baking temperature not substantially in excess of 1200° C.
4. A process as set forth in claim 3, wherein said resin body is gradually heated to said baking temperature over a period of several hours.
5. A process as set forth in claim 1, wherein said resin body is heated in said protective atmosphere for such a period that the carbonized body formed resists a mixture of 69% concentrated $HNO_3$ and 31% concentrated $H_2SO_4$ (by volume) at room temperature for one year without discoloration of said mixture.

References Cited

UNITED STATES PATENTS

| 3,124,625 | 3/1964 | Sheinberg et al. | 264—.5 |
| 3,137,742 | 6/1964 | Sowden | 264—.5 |
| 3,156,747 | 11/1964 | Burke | 264—.5 |

L. DEWAYNE RUTLEDGE, *Primary Examiner.*